US008377334B2

(12) United States Patent
Lyons

(10) Patent No.: US 8,377,334 B2
(45) Date of Patent: Feb. 19, 2013

(54) COATED PHOSPHORS, METHODS OF MAKING THEM, AND ARTICLES COMPRISING THE SAME

(75) Inventor: Robert Joseph Lyons, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/646,205

(22) Filed: Dec. 23, 2009

(65) Prior Publication Data

US 2011/0147664 A1    Jun. 23, 2011

(51) Int. Cl.
*C09K 11/08* (2006.01)
*B32B 9/00* (2006.01)

(52) U.S. Cl. ................ 252/301.4 H; 428/690

(58) Field of Classification Search .......... 428/336, 428/690; 427/212, 248.1; 252/301.4 R, 252/301.4 H
See application file for complete search history.

(56) References Cited

U.S. PATENT DOCUMENTS

| | | | |
|---|---|---|---|
| 2,945,128 A | 7/1960 | Sun et al. | |
| 4,473,634 A | 9/1984 | Dodds et al. | |
| 4,900,641 A * | 2/1990 | Kohda et al. | 428/690 |
| 5,378,397 A * | 1/1995 | Ferretti | 252/301.4 H |
| 5,585,202 A * | 12/1996 | Bringley et al. | 428/691 |
| 6,905,766 B2 * | 6/2005 | Chandler | 428/402.2 |
| 6,998,648 B2 | 2/2006 | Silvernail | |
| 2003/0059615 A1 | 3/2003 | Klinedinst et al. | |
| 2005/0085595 A1 | 4/2005 | Takase | |
| 2005/0100666 A1 * | 5/2005 | Hampden-Smith et al. | 427/212 |
| 2005/0233097 A1 * | 10/2005 | Tojo et al. | 428/32.26 |
| 2006/0024436 A1 | 2/2006 | Bayya et al. | |
| 2007/0298250 A1 | 12/2007 | Weimer et al. | |
| 2009/0027875 A1 * | 1/2009 | Terada et al. | 362/97.2 |
| 2010/0163798 A1 * | 7/2010 | Ryowa et al. | 252/301.4 R |
| 2010/0259156 A1 * | 10/2010 | Winkler et al. | 313/483 |

FOREIGN PATENT DOCUMENTS

| | | | |
|---|---|---|---|
| JP | 58074778 A | 5/1983 | |
| JP | 2007091986 A | 4/2007 | |

OTHER PUBLICATIONS

Hsieh et al., "Synthesis and Characterization of Mn-Doped Zn2SiO4/SiO2 Phosphor Particles in Core-Shell Structure", Journal of Luminescence, 2009, pp. 595-598, vol. 129.
Search Report and Written Opinion from corresponding PCT Application No. PCT/US2010/061440 dated Aug. 31, 2011.
Guo et al., "Improving the stability of Alkaline Earth Sulfide Based Phosphors by Oxide Coating." Chinese Journal of Luminescence. vol. 25, No. 4, pp. 449-454, 2004.

* cited by examiner

*Primary Examiner* — Emily Le
*Assistant Examiner* — Lynne Edmondson
(74) *Attorney, Agent, or Firm* — Mary Louise Stanford

(57) ABSTRACT

Compositions comprising a phosphor and a compound having the formula $R_1R_2M$, wherein $R_1$ is a substituted or unsubstituted alkyl, aryl, heteroaryl, arylalkyl, heteroarylalkyl, alkoxy, alkoxyl, acyl heterocycle, haloalkyl, oxaalkyl, or silyl; $R_2$ is a sulfate, sulfonate, or carboxylate and M is an alkali metal or an alkaline earth metal are provided. Phosphors coated with the compound, methods of making the coated phosphors and articles comprising the compositions are provided.

12 Claims, 2 Drawing Sheets

US 8,377,334 B2

COATED PHOSPHORS, METHODS OF MAKING THEM, AND ARTICLES COMPRISING THE SAME

STATEMENT REGARDING FEDERALLY SPONSORED RESEARCH OR DEVELOPMENT

Figure 1:
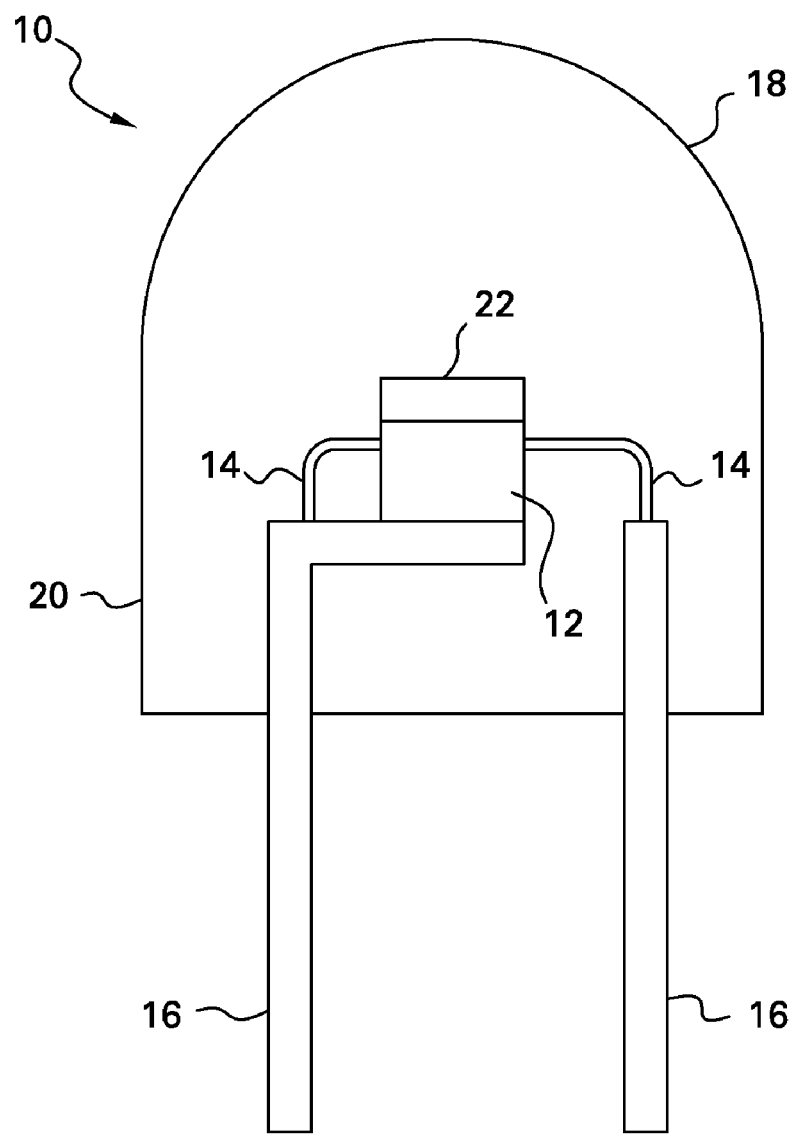

This invention was made with Government support under contract number DE-FC26-06NT42934 awarded by the U.S. Department of Energy. The Government has certain rights in the invention.

BACKGROUND

A phosphor is a luminescent material that absorbs radiation energy in a portion of the electromagnetic spectrum and emits energy in another portion of the electromagnetic spectrum. Some phosphors may require, or benefit from, the addition of small quantities of other elements, called "activators", that can convert the phosphors into more efficient fluorescent materials. Further, combinations of activators and host compounds can be used to control the color of the emission. As such, phosphors find use in flat panel plasma displays, cathode ray tubes, x-ray imaging devices, field emission devices, fluorescent lighting fixtures, light emitting diodes and a variety of other applications to generate visual images or simply provide light.

However, many phosphors have poor environmental stability that makes their use in some of these applications impractical. The most common causes of this lack of stability are hydrolysis from water vapor exposure and carbon dioxide absorption of basic metal oxides.

And so, phosphors may typically be coated with a coating that prevents these gases from contacting the phosphor surface, allowing these phosphors to be industrially useful. For example, polymers have been used to coat phosphors, and although such polymer coatings may slow the movement of gas to the phosphor surface, polymers have very open structures compared to the size of gas molecules. As a result, diffusion still occurs.

Inorganic oxide coatings were thus developed, and may typically be applied by chemical vapor deposition, physical vapor deposition or from a liquid organometallic precursor. However, the applicability of these processes depends on the processing conditions and the chemical compatibility of the phosphor with the chemical precursors. That is, these coatings may react with the phosphor, resulting in a degradation thereof. And, such coating techniques require the use of expensive vacuum equipment, which may be cost prohibitive in some applications It is thus desirable to provide phosphor coatings that can reduce or substantially prevent the degradation of the phosphor that can otherwise result from exposure of the phosphor to water vapor or carbon dioxide. Any such coating will also desirably be substantially inert to the underlying phosphor. The advantage of any such coatings could be further leveraged if their application did not require the use of expensive vacuum equipment.

BRIEF DESCRIPTION

In one aspect, a phosphor coated with a compound having the formula $R_1R_2M$, wherein $R_1$ is a substituted or unsubstituted alkyl, aryl, heteroaryl, arylalkyl, heteroarylalkyl, alkoxy, alkoxyl, acyl heterocycle, haloalkyl, oxaalkyl, or silyl; $R_2$ is a sulfate, sulfonate, or carboxylate and M is an alkali metal or an alkaline earth metal is provided.

In another aspect, a composition is provided comprising a phosphor and a compound having the formula $R_1R_2M$, wherein $R_1$ is a substituted or unsubstituted alkyl, aryl, heteroaryl, arylalkyl, heteroarylalkyl, alkoxy, alkoxyl, acyl, heterocycle, haloalkyl, oxaalkyl, or silyl; $R_2$ is a sulfate, sulfonate, or carboxylate; and M is an alkali metal or an alkaline earth metal.

In another aspect, a method for producing a coated phosphor is provided. The method comprises providing a slurry of a water insoluble compound having the formula $R_1R_2M$, wherein $R_1$ is a substituted or unsubstituted alkyl, aryl, heteroaryl, arylalkyl, heteroarylalkyl, alkoxy, alkoxyl, acyl, heterocycle, haloalkyl, oxaalkyl, or silyl; $R_2$ is a sulfate, sulfonate, or carboxylate; and M is an alkali metal or an alkaline earth metal and a nonaqueous solvent. An amount of the phosphor desirably coated is added to the slurry to provide a mixture. The solvent is then removed from the mixture, and the mixture then heated until at least a portion of the compound dries or melts onto at least a portion of the amount of the phosphor to provide an amount of coated phosphor.

Articles comprising a phosphor coated with a compound having the formula $R_1R_2M$, wherein $R_1$ is a substituted or unsubstituted alkyl, aryl, heteroaryl, arylalkyl, heteroarylalkyl, alkoxy, alkoxyl, acyl, heterocycle, haloalkyl, oxaalkyl, or silyl; $R_2$ is a sulfate, sulfonate, or carboxylate; and M is an alkali metal or an alkaline earth metal are also provided.

DRAWINGS

Figure 2:
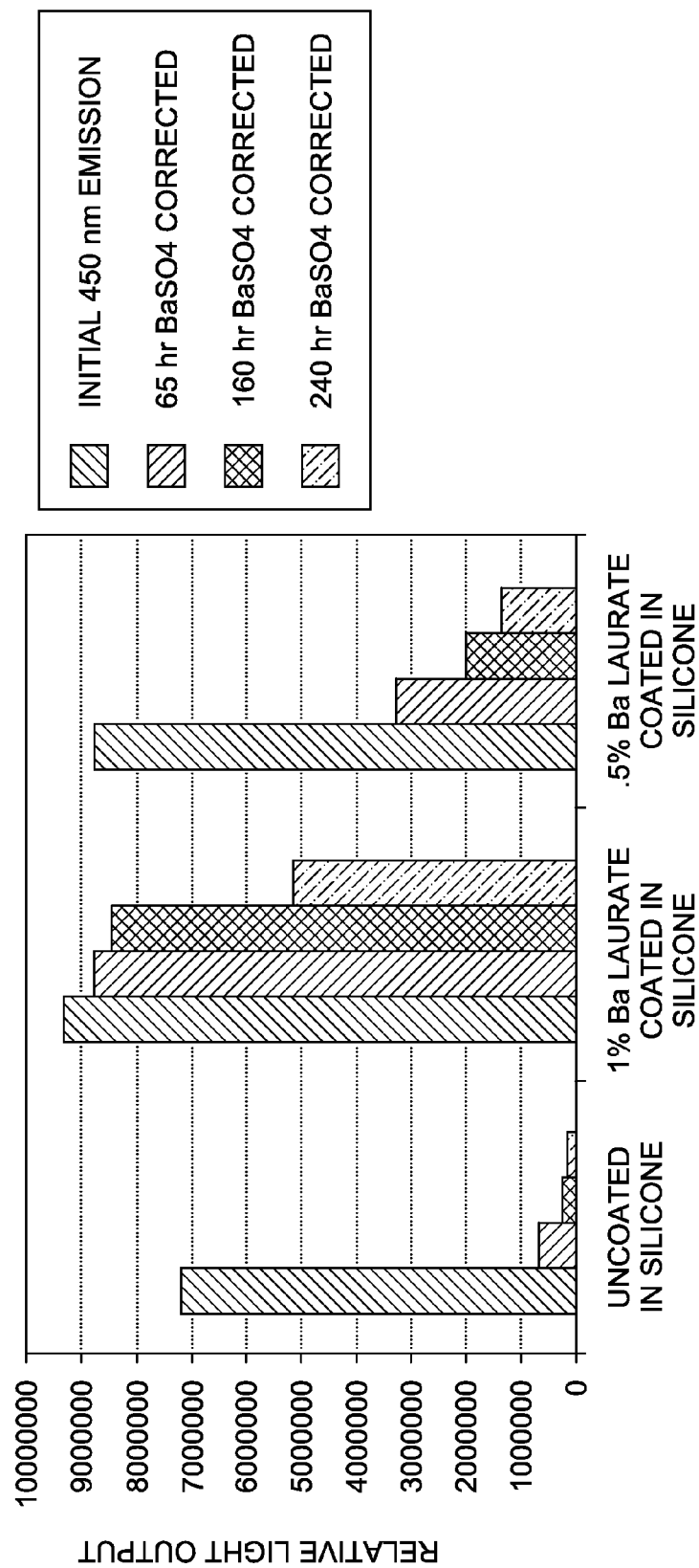

These and other features, aspects, and advantages of the invention will become better understood when the following detailed description is read with reference to the accompanying drawings in which like characters represent like parts throughout the drawings, wherein:

FIG. 1 is a schematic cross-sectional view of an article according to one embodiment; and FIG. 2 is a graphical depiction of the emission of coated phosphors according to some embodiments, in comparison to conventional uncoated phosphors, after exposure to 80° C. at 80% relative humidity.

DETAILED DESCRIPTION

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable (e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc.). The modifier "about" used in connection with a quantity is inclusive of the stated value and has the meaning dictated by the context (e.g., includes the degree of error associated with measurement of the particular quantity).

There are provided herein compositions comprising at least one phosphor and at least one compound of the formula $R_1R_2M$ wherein $R_1$ is a substituted or unsubstituted alkyl, aryl, heteroaryl, arylalkyl, hetero aryl alkyl, alkoxy, alkoxyl, acyl, heterocycle, haloalkyl, oxaalkyl, or silyl; $R_2$ is a sulfate, sulfonate, or carboxylate; and M is an alkali metal or an alkaline earth metal. In some embodiments, the compound may be an alkaline earth carboxylate. Phosphors coated with the compound are provided as are methods of producing the coated phosphors. Articles comprising the composition are also provided. Because the compounds, particularly alkaline earth carboxylates are substantially inert to many, if not nearly all, known phosphors, their use in the compositions, and as coatings for phosphors, is not particularly limited by their reactivity. Additionally, the disclosed compounds may typically be applied at temperatures lower than those required for conventional phosphor coatings, such as oxide coatings, and so thermal degradation of the phosphors can be reduced or eliminated, and energy cost savings are provided. Finally, many, if not substantially all, of the compounds need not be applied by costly physical vapor deposition or chemical vapor deposition techniques, and further cost savings can be realized.

The phosphor utilized in the composition or to be coated can be any known phosphor, or combination of phosphors, including, for example known red, green and blue phosphors used in the production of cathode ray tubes. Numerous phosphors are known in the art of lamp and electroluminescent lamps, and any of these can be utilized. Further, the suitable phosphors are not necessarily limited, or at least as limited, by their decomposition temperatures, since the coatings described herein do not have to be applied at the elevated temperatures required by physical and chemical vapor deposition techniques. Bearing all of these considerations in mind, examples of suitable phosphors include but are not limited to, yellow-orange phosphors, such as $(Sr,Ca,Ba,Mg,Zn)_2P_2O_7$: $Eu^{2+}$, $Mn^{2+}$ (SPP) and $(Ca,Sr,Ba,Mg)_{10}(PO_4)_6(F,Cl,Br,OH)$: $Eu^{2+},Mn^{2+}$ (HALO); red phosphors such as $(Gd,Y,Lu,La)_2O_3:Eu^{3+},Bi^{3+}$, $(Gd,Y,Lu,La)_2O_2S:Eu^{3+},Bi^{3+}$, $(Gd,Y,Lu,La)VO_4:Eu^{3+},Bi^{3+}$, $(Ca,Sr)S:Eu^{2+}$, $SrY_2S_4:Eu^{2+}$, $CaLa_2S_4:Ce^{3+}$, $(Ca,Sr)S:Eu^{2+}$, $3.5MgO*0.5MgF_2*GeO_2:Mn^{4+}$ (MFG), $(Ba,Sr,Ca)MgP_2O_7:Eu^{2+},Mn^{2+}$, $(Y,Lu)_2WO_6:Eu^{3+}, Mo^{6+}$, $(Ba,Sr,Ca)_xSi_yN_z:Eu^{2+}$, $(Sr,Ca,Ba)_3MgSi_2O_8:Eu^{2+},Mn^{2+}$. $K_2TiF_6$: $Mn^{4+}$, $K_2SiF_6:Mn^{4+}$, $K_2GeF_6:Mn^{4+}$ can also be used. Suitable phosphors are also disclosed in U.S. Pat. No. 7,274,045 and U.S. Pat. No. 7,094,362, both assigned to the General Electric Company. Combinations of two or more of any of these may also be utilized.

The phosphor(s) utilized in the composition or desirably coated need not be 100% pure, but rather, may contain substantially optically inert trace impurities including, for example, calcium silicates and calcium aluminum silicates. The presence of such impurities in an amount up to 10% by weight of the phosphor composition will not significantly affect the quantum efficiency or color of the phosphor.

Many phosphors are commercially available from a wide variety of sources familiar to those of ordinary skill in the art. Or, the phosphor(s) utilized in the composition or to be coated may be readily synthesized by those of ordinary skill in the art, using any of the many known methods to do so.

For example, the desired phosphor(s) may be produced using known solid state reaction processes for the production of phosphors by combining, for example, elemental oxides, carbonates and/or hydroxides as starting materials. Or, the desired phosphor(s) may be produced using a conventional array slurry method.

The phosphor(s) utilized or to be coated can be of any suitable size, given the desired application of the coated phosphor. Generally speaking, the phosphors to be coated may have average diameters of from about 0.5 microns to about 200 microns.

The compound used in the composition and/or coating has the formula $R_1R_2M$, wherein $R_1$ is a substituted or unsubstituted alkyl, aryl, heteroaryl, arylalkyl, heteroarylalkyl, alkoxy, alkoxyl, acyl, heterocycle, haloalkyl, oxaalkyl, or silyl; $R_2$ is a sulfate ($SO_4^{-2}$), sulfonate ($SO_2O^-$), or carboxylate ($COO^-$); and M is an alkali metal (lithium (Li), sodium (Na), potassium (K), rubidium (Rb), cesium (Cs), francium (Fr)) or an alkaline earth metal (magnesium (Mg), calcium (Ca), strontium (Sr), barium (Ba), radium (Ra)).

In the context of the present invention, alkyl is intended to include linear, branched, or cyclic hydrocarbon structures and combinations thereof, including lower alkyl and higher alkyl. Preferred alkyl groups are those of $C_{20}$ or below. Lower alkyl refers to alkyl groups of from 1 to 6 carbon atoms, preferably from 1 to 4 carbon atoms, and includes methyl, ethyl, n-propyl, isopropyl, and n-, s- and t-butyl. Higher alkyl refers to alkyl groups having seven or more carbon atoms, preferably 7-20 carbon atoms, and includes n-, s- and t-heptyl, octyl, and dodecyl. Cycloalkyl is a subset of alkyl and includes cyclic hydrocarbon groups of from 3 to 8 carbon atoms. Examples of cycloalkyl groups include cyclopropyl, cyclobutyl, cyclopentyl, and norbornyl. Alkenyl and alkynyl refer to alkyl groups wherein two or more hydrogen atoms are replaced by a double or triple bond, respectively.

Aryl and heteroaryl mean a 5- or 6-membered aromatic or heteroaromatic ring containing 0-3 heteroatoms selected from nitrogen, oxygen or sulfur; a bicyclic 9- or 10-membered aromatic or heteroaromatic ring system containing 0-3 heteroatoms selected from nitrogen, oxygen or sulfur; or a tricyclic 13- or 14-membered aromatic or heteroaromatic ring system containing 0-3 heteroatoms selected from nitrogen, oxygen or sulfur. The aromatic 6- to 14-membered carbocyclic rings include, for example, benzene, naphthalene, indane, tetralin, and fluorene; and the 5- to 10-membered aromatic heterocyclic rings include, e.g., imidazole, pyridine, indole, thiophene, benzopyranone, thiazole, furan, benzimidazole, quinoline, isoquinoline, quinoxaline, pyrimidine, pyrazine, tetrazole and pyrazole.

Arylalkyl means an alkyl residue attached to an aryl ring. Examples are benzyl and phenethyl. Heteroarylalkyl means an alkyl residue attached to a heteroaryl ring. Examples include pyridinylmethyl and pyrimidinylethyl. Alkylaryl means an aryl residue having one or more alkyl groups attached thereto. Examples are tolyl and mesityl.

Alkoxy or alkoxyl refers to groups of from 1 to 8 carbon atoms of a straight, branched, cyclic configuration and combinations thereof attached to the parent structure through an oxygen. Examples include methoxy, ethoxy, propoxy, isopropoxy, cyclopropyloxy, and cyclohexyloxy. Lower alkoxy refers to groups containing one to four carbons.

Acyl refers to groups of from 1 to 8 carbon atoms of a straight, branched, cyclic configuration, saturated, unsaturated and aromatic and combinations thereof, attached to the parent structure through a carbonyl functionality. One or more carbons in the acyl residue may be replaced by nitrogen, oxygen or sulfur as long as the point of attachment to the parent remains at the carbonyl. Examples include acetyl, benzoyl, propionyl, isobutyryl, t-butoxycarbonyl, and benzyloxycarbonyl. Lower-acyl refers to groups containing one to four carbons.

Heterocycle means a cycloalkyl or aryl residue in which one or two of the carbon atoms is replaced by a heteroatom such as oxygen, nitrogen or sulfur. Examples of heterocycles that fall within the scope of the invention include pyrrolidine, pyrazole, pyrrole, indole, quinoline, isoquinoline, tetrahydroisoquinoline, benzofuran, benzodioxan, benzodioxole (commonly referred to as methylenedioxyphenyl, when occurring as a substituent), tetrazole, morpholine, thiazole, pyridine, pyridazine, pyrimidine, thiophene, furan, oxazole, oxazoline, isoxazole, dioxane, and tetrahydrofuran.

Substituted refers to residues, including, but not limited to, alkyl, alkylaryl, aryl, arylalkyl, and heteroaryl, wherein up to three H atoms of the residue are replaced with lower alkyl, substituted alkyl, alkenyl, substituted alkenyl, aryl, substituted aryl, haloalkyl, alkoxy, carbonyl, carboxy, carboxalkoxy, carboxamido, acyloxy, amidino, nitro, halo, hydroxy, $OCH(COOH)_2$, cyano, primary amino, secondary amino, acylamino, alkylthio, sulfoxide, sulfone, phenyl, benzyl, phenoxy, benzyloxy, heteroaryl, or heteroaryloxy.

Haloalkyl refers to an alkyl residue, wherein one or more H atoms are replaced by halogen atoms; the term haloalkyl includes perhaloalkyl. Examples of haloalkyl groups that fall within the scope of the invention include $CH_2F$, $CHF_2$, and $CF_3$.

Many of the compounds described herein may contain one or more asymmetric centers and may thus give rise to enantiomers, diastereomers, and other stereoisomeric forms that may be defined, in terms of absolute stereochemistry, as (R)- or (S)-. The present invention is meant to include all such possible isomers, as well as, their racemic and optically pure forms. Optically active (R)- and (S)-isomers may be prepared using chiral synthons or chiral reagents, or resolved using conventional techniques. When the compounds described herein contain olefinic double bonds or other centers of geometric asymmetry, and unless specified otherwise, it is intended that the compounds include both E and Z geometric isomers. Likewise, all tautomeric forms are also intended to be included.

Oxaalkyl refers to an alkyl residue in which one or more carbons have been replaced by oxygen. It is attached to the parent structure through an alkyl residue. Examples include methoxypropoxy, 3,6,9-trioxadecyl and the like. The term oxaalkyl is intended as it is understood in the art [see Naming and Indexing of Chemical Substances for Chemical Abstracts, published by the American Chemical Society, ¶196, but without the restriction of ¶127(a)], i.e. it refers to compounds in which the oxygen is bonded via a single bond to its adjacent atoms (forming ether bonds); it does not refer to doubly bonded oxygen, as would be found in carbonyl groups. Similarly, thiaalkyl and azaalkyl refer to alkyl residues in which one or more carbons has been replaced by sulfur or nitrogen, respectively. Examples include ethylaminoethyl and methylthiopropyl.

Silyl means an alkyl residue in which one to three of the carbons is replaced by tetravalent silicon and which is attached to the parent structure through a silicon atom. Siloxy is an alkoxy residue in which both of the carbons are replaced by tetravalent silicon that is endcapped with an alkyl residue, aryl residue or a cycloalkyl residue, and which is attached to the parent structure through an oxygen atom.

And so, in some embodiments, compounds having the formula $R_1R_2M$ may generally be classified as anionic surfactants. Anionic surfactants are well known to those of ordinary skill in the art and include, for example, ether carboxylic acids, alkylarylsulfonates (such as alkyl benzene sulfonate), alkane sulfonates, olefin sulfonates, alcohol sulfates (such as sodium dodecyl sulfate (SDS) and ammonium lauryl sulfate), alcohol ether sulfates, sulfated glycerides, sulfates alkanol amides, and the like.

In some embodiments, the compound used in the composition and/or to coat the phosphor may comprise an alkali metal carboxylate or an alkaline earth carboxylate. In some embodiments, the compound used in the composition and/or to coat the phosphor comprises an alkaline earth carboxylate. The particular alkaline earth carboxylate is not limited and can be any carboxylate comprising any alkaline earth metal, or combination of the alkaline earth metals, i.e., calcium, magnesium, strontium, barium, or combinations of these. In some embodiments, the alkaline earth metal may be calcium, magnesium, barium or combinations of these. In some embodiments, the alkaline earth carboxylate may be water insoluble. In some embodiments, the alkaline earth carboxylate may be an oleate, palmitate, myristate, laurate or stearate. For example, in some embodiments, the alkaline earth carboxylate may be barium oleate, barium palmitate, barium myristate, barium laurate and barium stearate. In some embodiments, the alkaline earth carboxylate comprises barium laurate, barium stearate, or combinations of these.

As used herein, in those embodiments wherein the compound is said to coat the phosphor, the terms "coat", "coating" or "coated" refers to a layer, or shell, that at least partially, and desirably substantially completely, envelopes the desired phosphor, or combination of phosphors. As used herein, a coating can be a monolayer, or, can include multiple sublayers. Furthermore, it is to be understood that variations in the coatings, either between individual phosphors, or on the same coated phosphor, may occur and some coatings may be uneven or incomplete, i.e., so as to not completely envelope or encompass the phosphor. Desirably, the phosphor will be coated to such a degree that the coating is capable of preventing the substantial degradation of the phosphor when the coated phosphor is exposed to carbon dioxide or water vapor. Generally speaking, the coating may have an average thickness of from about 100 Angstroms to about 2 microns.

In those embodiments wherein the compound is coated on to the phosphor, the same may be achieved by any known method, and advantageously may be coated onto the phosphor without the use of physical or chemical vapor deposition techniques. In some embodiments, the compound may be applied to the phosphor in the form of a slurry. In such embodiments, a slurry of the compound may be prepared with an organic solvent, such as methanol, ethanol, diethyl ether or combinations of these. In some embodiments, the compound is provided as a slurry with an alcohol, such as, e.g., methanol.

The concentration of the compound in the slurry may range from about 1 weight % to about 20 weight %.

The compound and chosen solvent may simply be mixed to provide the slurry, or, the compound may be milled with the desired solvent until the slurry is created. The latter embodiment may advantageously provide smaller particles of the compound, which may, in turn, allow for a more uniform coating thereof on the desired phosphor.

Once the desired slurry has been prepared, the phosphor desirably coated is added to the slurry. In some embodiments, the phosphor is added to the slurry in a ratio of 99:1 phosphor (s):compound. In terms of weight percent, in some embodiments, 1 wt % of the compound may be applied to 99 wt % phosphor, by total weight of the mixture of the coating and the phosphor. The slurry and phosphor are then mixed until substantially all of the phosphor has been wetted with the slurry, with additional amounts of the desired solvent added if necessary, or desired. The solvent is then substantially removed, e.g., by evaporation, leaving primarily phosphors coated with the compound.

The coated phosphor is then heated at a time and temperature sufficient to dry and/or melt at least a portion, i.e., less than 50%, or a majority, i.e., greater than 50%, or even substantially all, i.e., greater than 90%, of the compound particles. The time and temperature required to do so will depend on the compound and/or solvent used, and in some embodiments, may also be limited by the phosphor desirably coated.

Generally speaking, many of the compounds described will dry and/or melt at temperatures below about 300° C., or below 280° C., or at temperatures of less than about 270° C. The time of heating can be determined by observation, i.e., heating can be carried out until drying and/or melting of the compound can be observed, either visually, or by smell. Generally speaking, heating times of less than 30 minutes, or less than 20 minutes, or of about 10 minutes can be sufficient.

Since some of the compounds may experience at least some amount of degradation in the presence of oxygen, in embodiments wherein such compounds are desirably coated, the heating step may desirably be carried out under an inert atmosphere, such as under a nitrogen or argon environment.

The resulting coating will desirably protect the coated phosphor from water vapor and/or carbon dioxide, i.e., the coating may at least reduce, or even substantially prevent, the decomposition of the coated phosphor in high temperature, e.g., temperatures of greater than about 70° F., or greater than about 75° F. or even greater than about 80° F., and/or high humidity, i.e., greater than about 70% relative humidity, or greater than about 75% relative humidity, or even greater than about 80% relative humidity, environments.

The coated phosphors are thus suitable for use in a wide variety of articles. For example, the coated phosphors may be used in a plasma display device, cathode ray tube, x-ray imaging device, field emission device, liquid crystal display fluorescent lamp or LED. The material may also be used as a scintillator in an electromagnetic calorimeter, in a gamma ray camera, in a computed tomography scanner or in a laser. These uses are meant to be merely exemplary and not exhaustive.

One example of such an article is shown in FIG. 1. In particular, FIG. 1 shows lighting apparatus or light emitting assembly or lamp 10 in accordance with one embodiment of the article provided herein. Lighting apparatus 10 comprises a semiconductor long wave ultraviolet or violet radiation source, such as a light emitting diode (LED) chip 12 and leads 14 electrically attached to the LED chip. The leads 14 may comprise thin wires supported by a thicker lead frame(s) 16 or the leads may comprise self supported electrodes and the lead frame may be omitted. The leads 14 provide current to the LED chip 12 and thus cause the LED chip 12 to emit radiation.

The lamp may include any semiconductor blue or UV light source that is capable of producing white light when its emitted radiation is directed onto the phosphor or phosphors. The radiation source is described herein as an LED for convenience. However, as used herein, the term is meant to encompass all semiconductor radiation sources including, e.g., semiconductor laser diodes.

The LED chip 12 may be encapsulated within a shell 18, which encloses the LED chip and an encapsulant material 20. The shell 18 may be, for example, glass or plastic. LED 12 may be substantially centered in the encapsulant 20. The encapsulant 20 may be an epoxy, plastic, low temperature glass, polymer, thermoplastic, thermoset material, resin or other type of LED encapsulating material as is known in the art.

Lighting apparatus 10 includes coated phosphor composition 22, described below, radiationally coupled to the LED chip 12. Radiationally coupled means that the elements are associated with each other so radiation from one is transmitted to the other. Coated phosphor composition 22 is deposited on the LED 12 by any appropriate method.

In other embodiments, the phosphor composition 22 is interspersed within the encapsulant material 20, instead of being formed directly on the LED chip 12. The phosphor (in the form of a powder) may be interspersed within a single region of the encapsulant material 20 or throughout the entire volume of the encapsulant material. Other known phosphor interspersion methods may also be used, such as transfer loading. In yet another embodiment, phosphor composition 22 is coated onto a surface of the shell 18, instead of being formed over the LED chip 12.

The coated phosphor composition 22 includes at least one coated phosphor, optionally blended with one or more other phosphors, whether coated or not. Coated phosphor composition 22 may also include pigments or filters in amounts of from 0 wt % up to about 5 wt % (based on the total weight of the phosphors) capable of absorbing UV radiation within a desired wavelength range.

Such pigments or filters are well known to those of ordinary skill in the art. For example, pigments or filters capable of absorbing radiation generated between 250 nm and 450 nm include, for example, nickel titanate or praseodimium zirconate. Any such desired pigment may be used in an amount effective to filter 10% to 100% of the radiation generated in the 250 nm to 450 nm range.

The following examples are provided to illustrate the invention, but are not intended to limit its scope. All parts and percentages are by weight unless otherwise specified.

EXAMPLE 1

A slurry of barium laurate is formed by milling 6 grams of barium laurate (City Chemical) with 50 milliliters of anhydrous methanol (Aldrich Chemical) and 5 drops of perfluoro-1-octanesulfonyl fluoride (Aldrich Chemical). Milling is done in a 125 milliliter wide mouth polyethylene bottle, one half full of 5 mm diameter spherical zirconia milling media for 15 hours. A portion of the slurry is weighed on an analytical balance and then evaporated to dryness and weighed again to obtain the weight of barium laurate in the slurry per gram of slurry. Manganese IV doped potassium titanium hexafluoride ($K_2TiF_6$) to be coated is weighed into a borosilicate glass beaker and enough of the barium laurate slurry is added to provide 1 wt % of barium laurate upon drying. Enough dry methanol is added to completely wet the phosphor powder and the barium laurate is stirred into the phosphor. The methanol is evaporated slightly below its boiling point. After drying the beaker is placed in a preheated nitrogen flushed furnace at 275° C. for 10 minutes to melt the barium laurate. The beaker is removed from the oven and cooled in air.

A suspension of 0.5 grams of this coated phosphor was mixed with 1 gram of RTV 615A silicone gel, comprised of 0.9 grams of resin and 0.1 gram of hardener. The mixture is used to fill a depression 1/16" deep that has been milled into an aluminum 1/4" thick plate which has been cut to the size required for the spectrometer (1.25" by 1.5"). The silicone resin is cured in an oven at 65° C. for 2 hours.

FIG. 2 shows the emission data taken with a fluorescence spectrometer with a 405 nm excitation wavelength and with the light output integrated from 500 to 750 nm. The integrated light output was compared before and after exposure to 80% relative humidity at 80° C. for the reported number of hours. FIG. 2 also includes data taken from samples comprising 0.5 wt % barium laurate.

As shown, the uncoated phosphor exhibits dramatically decreased emission after exposure to the high temperature, high humidity environment even after only 65 hours of exposure. Both the 0.5 wt % and 1 wt % barium laurate coated phosphor showed improvement over the uncoated, control sample, with the 1 wt % barium laurate coated phosphor showing only slight decreases in emission after 65 hour and 160 hour exposure times.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A coated phosphor consisting of a $Mn^{+4}$ activated fluoride complex phosphor coated with a compound having the formula $R_1R_2M$, wherein $R_1$ is a substituted or unsubstituted alkyl, aryl, heteroaryl, arylalkyl, heteroarylalkyl, alkoxy, alkoxyl, acyl heterocycle, haloalkyl, oxaalkyl, or silyl; $R_2$ is a carboxylate and M is an alkali metal or an alkaline earth metal.

2. The coated phosphor of claim 1, wherein the compound is an alkaline earth alkyl carboxylate.

3. The coated phosphor of claim 1, wherein the compound is water insoluble.

4. The coated phosphor of claim 2, wherein the alkaline earth carboxylate comprises calcium, magnesium, strontium, barium, or combinations of these.

5. The coated phosphor of claim 3, wherein M is calcium, magnesium, barium or a combination thereof.

6. The coated phosphor of claim 4, wherein the alkaline earth carboxylate comprises barium.

7. The coated phosphor of claim 5, wherein the compound having the formula $R_1R_2M$ is barium laurate or barium stearate.

8. A composition comprising a $Mn^{+4}$ activated fluoride complex phosphor and a compound having the formula $R_1R_2M$, wherein $R_1$ is a substituted or unsubstituted alkyl, aryl, heteroaryl, arylalkyl, heteroarylalkyl, alkoxy, alkoxyl, acyl heterocycle, haloalkyl, oxaalkyl, or silyl; $R_2$ is a carboxylate and M is an alkali metal or an alkaline earth metal.

9. The composition of claim 8, wherein the compound is an alkaline earth carboxylate.

10. An article comprising a composition comprising a $Mn^{+4}$ activated fluoride complex phosphor susceptible to hydrolysis and a compound having the formula $R_1R_2M$, wherein $R_1$ is a substituted or unsubstituted alkyl, aryl, heteroaryl, arylalkyl, heteroarylalkyl, alkoxy, alkoxyl, acyl heterocycle, haloalkyl, oxaalkyl, or silyl; $R_2$ is a carboxylate and M is an alkali metal or an alkaline earth metal.

11. The article of claim 10, wherein the phosphor is coated with the compound.

12. The article of claim 10, comprising a plasma display device, cathode ray tube, x-ray imaging device, field emission device, liquid crystal display, fluorescent lamp, LED, electromagnetic calorimeter, gamma ray camera, computed tomography scanner or laser.

* * * * *